(12) United States Patent
Herron et al.

(10) Patent No.: US 11,508,191 B1
(45) Date of Patent: Nov. 22, 2022

(54) VEHICLE DIAGNOSTIC INTERFACE DEVICE

(71) Applicant: Opus IVS, Inc., Ann Arbor, MI (US)

(72) Inventors: Brian J. Herron, Dexter, MI (US); Andrew D. Betteley, Buckinghamshire (GB); Mark W. Wine, Ann Arbor, MI (US)

(73) Assignee: Opus IVS, Inc., Ann Arbor, MI (US)

( * ) Notice: Subject to any disclaimer, the term of this patent is extended or adjusted under 35 U.S.C. 154(b) by 427 days.

(21) Appl. No.: 16/701,914

(22) Filed: Dec. 3, 2019

(51) Int. Cl.
    *G07C 5/08* (2006.01)
    *G06F 1/16* (2006.01)
    *G07C 5/00* (2006.01)

(52) U.S. Cl.
CPC ......... *G07C 5/0808* (2013.01); *G06F 1/1613* (2013.01); *G06F 1/1626* (2013.01); *G07C 5/008* (2013.01); *G06F 2213/0042* (2013.01); *G06F 2213/3814* (2013.01)

(58) Field of Classification Search
CPC ..... G07C 5/0808; G07C 5/008; G06F 1/1613; G06F 1/1626; G06F 2213/0042; G06F 2213/3814
USPC ...................................................... 701/29.1
See application file for complete search history.

(56) References Cited

U.S. PATENT DOCUMENTS

| | | |
|---|---|---|
| 6,154,658 A | 11/2000 | Caci |
| 6,728,603 B2 | 4/2004 | Pruzan et al. |
| 6,879,894 B1 | 4/2005 | Lightner et al. |
| 6,956,501 B2 | 10/2005 | Kitson |
| 7,092,803 B2 | 8/2006 | Kapolka et al. |
| 7,373,226 B1 | 5/2008 | Cancilla et al. |
| 7,502,672 B1 | 3/2009 | Kolls |
| 7,519,458 B2 | 4/2009 | Buckley |
| 7,532,962 B1 | 5/2009 | Lowrey et al. |
| 7,584,030 B1 | 9/2009 | Graham |
| 7,786,851 B2 | 8/2010 | Drew et al. |
| 7,840,812 B1 | 11/2010 | Levenberg |
| 7,928,837 B2 | 4/2011 | Drew et al. |
| 8,190,322 B2 | 5/2012 | Lin et al. |

(Continued)

FOREIGN PATENT DOCUMENTS

WO     2004092857 A2    10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.

(Continued)

*Primary Examiner* — William D Titcomb
(74) *Attorney, Agent, or Firm* — Gardner, Linn, Burkhart & Ondersma LLP

(57) ABSTRACT

A vehicle interface device for diagnosing, scanning and programming an electrical system of a vehicle having a housing and being connectable to an electrical system of a vehicle, a local diagnostic computer, and a remote diagnostic computer. The vehicle interface device is selectively switchable for operation in either a local mode or a remote mode. In the local mode, the vehicle interface device is connected with the local diagnostic computer and operates as a pass-thru device. In the remote mode, the vehicle interface device is connected with the remote diagnostic computer.

20 Claims, 3 Drawing Sheets

(56) References Cited

U.S. PATENT DOCUMENTS

| | | | |
|---|---|---|---|
| 8,259,936 B2 | 9/2012 | Mahalingaiah | |
| 8,306,687 B2 | 11/2012 | Chen | |
| 8,339,254 B2 | 12/2012 | Drew et al. | |
| 8,352,577 B2 | 1/2013 | Martone | |
| 8,638,207 B2 | 1/2014 | Drew et al. | |
| 8,688,313 B2 | 4/2014 | Margol et al. | |
| 8,909,416 B2 | 12/2014 | Chen et al. | |
| 8,918,245 B2 | 12/2014 | Dewhurst et al. | |
| 9,430,884 B2 | 8/2016 | Drew et al. | |
| 9,530,255 B2 | 12/2016 | Drew et al. | |
| 9,563,988 B2 | 2/2017 | Drew et al. | |
| 9,646,130 B2 | 5/2017 | Drew et al. | |
| 10,013,816 B2 | 7/2018 | Nassar et al. | |
| 10,146,521 B2 | 12/2018 | West et al. | |
| 10,181,225 B2 | 1/2019 | Liebl et al. | |
| 10,282,924 B2 | 5/2019 | Drew et al. | |
| 10,414,277 B1 | 9/2019 | Herron et al. | |
| 10,445,953 B1 | 10/2019 | Herron et al. | |
| 10,650,621 B1 * | 5/2020 | King | H04L 67/12 |
| 10,706,645 B1 | 7/2020 | Herron et al. | |
| 10,719,813 B1 | 7/2020 | Beckmann et al. | |
| 10,748,356 B1 * | 8/2020 | Herron | G07C 5/0808 |
| 11,062,534 B2 | 7/2021 | Jingle et al. | |
| 11,257,307 B1 * | 2/2022 | Herron | G07C 5/0808 |
| 2001/0056544 A1 | 12/2001 | Walker | |
| 2003/0001720 A1 | 1/2003 | Wade et al. | |
| 2003/0020759 A1 | 1/2003 | Cancilla et al. | |
| 2004/0044454 A1 | 3/2004 | Ross et al. | |
| 2004/0167689 A1 | 8/2004 | Bromley et al. | |
| 2005/0021294 A1 | 1/2005 | Trsar et al. | |
| 2005/0038581 A1 | 2/2005 | Kapolka et al. | |
| 2005/0060070 A1 | 3/2005 | Kapolka et al. | |
| 2005/0065678 A1 * | 3/2005 | Smith | G06Q 10/00 701/1 |
| 2005/0182537 A1 | 8/2005 | Tefft et al. | |
| 2005/0240555 A1 | 10/2005 | Wilde et al. | |
| 2005/0251304 A1 | 11/2005 | Cancellara et al. | |
| 2006/0052921 A1 | 3/2006 | Bodin et al. | |
| 2006/0106508 A1 | 5/2006 | Liebl et al. | |
| 2006/0211446 A1 | 9/2006 | Wittmann et al. | |
| 2007/0005201 A1 | 1/2007 | Chenn | |
| 2007/0043488 A1 | 2/2007 | Avery et al. | |
| 2007/0050105 A1 | 3/2007 | Chinnadurai et al. | |
| 2007/0055420 A1 | 3/2007 | Krzystofczyk et al. | |
| 2007/0073460 A1 | 3/2007 | Bertosa et al. | |
| 2007/0185624 A1 | 8/2007 | Duddles et al. | |
| 2007/0233340 A1 | 10/2007 | Raichle et al. | |
| 2008/0177438 A1 | 7/2008 | Chen et al. | |
| 2008/0269975 A1 | 10/2008 | Bertosa | |
| 2008/0280602 A1 | 11/2008 | Ban | |
| 2008/0306645 A1 | 12/2008 | Dewhurst et al. | |
| 2009/0062978 A1 | 3/2009 | Picard | |
| 2009/0118899 A1 | 5/2009 | Carlson | |
| 2009/0119657 A1 | 5/2009 | Link, II | |
| 2009/0187976 A1 | 7/2009 | Perroud et al. | |
| 2009/0265055 A1 | 10/2009 | Gillies | |
| 2009/0276115 A1 | 11/2009 | Chen | |
| 2010/0042287 A1 | 2/2010 | Zhang | |
| 2010/0174446 A1 | 7/2010 | Andreasen et al. | |
| 2010/0204878 A1 | 8/2010 | Drew et al. | |
| 2010/0205450 A1 | 8/2010 | Samacke et al. | |
| 2010/0262335 A1 | 10/2010 | Brozovich | |
| 2011/0071709 A1 | 3/2011 | Damiani et al. | |
| 2011/0112718 A1 | 5/2011 | Claus et al. | |
| 2011/0153150 A1 | 6/2011 | Drew et al. | |
| 2011/0276218 A1 | 11/2011 | Dwan | |
| 2011/0313593 A1 | 12/2011 | Cohen et al. | |
| 2012/0046826 A1 | 2/2012 | Panko | |
| 2012/0047291 A1 * | 2/2012 | Davis | G07C 5/0825 710/14 |
| 2012/0254345 A1 | 10/2012 | Montoya | |
| 2014/0019000 A1 * | 1/2014 | Ruther | G01M 17/007 701/31.4 |
| 2017/0186248 A1 * | 6/2017 | Fournier | G05D 1/0088 |
| 2017/0301154 A1 | 10/2017 | Rozint | |
| 2019/0371091 A1 * | 12/2019 | Frisch | G07C 5/0808 |

OTHER PUBLICATIONS

Thesis entitled "Remote Connection of Diagnostic Tool" by Irina Elena Apetri and Ali Raza, Chalmers University of Technology, dated 2011.

* cited by examiner

VEHICLE DIAGNOSTIC INTERFACE DEVICE

BACKGROUND AND FIELD OF THE INVENTION

The present invention is directed to a vehicle diagnostic interface device for diagnosing, scanning and programming the electrical system of a vehicle, and in particular to a vehicle interface device configured to provide optional pass through vehicle communications with a local computer or communications with a remote computer system.

Repair facilities must diagnose the electronic computer systems of vehicles, including scanning and reprogramming electronic control units of the vehicle electronic computer systems as needed for software updates and/or repairs. Repair facilities may obtain equipment so as to be able to perform such diagnostic operations locally within the repair facility, including by way of pass through interface devices that operate according to the SAE J2534 standard, and local computers utilizing diagnostic software applications for use in scanning, diagnosing and reprogramming the vehicle. Repair facilities may also obtain alternative equipment whereby diagnostic and reprograming operations are facilitated via remote diagnostic computer systems, in which case the vehicle will be connected with specialized electronic equipment to facilitate the transmission of vehicle data via the Internet.

SUMMARY OF THE INVENTION

The present invention provides a vehicle interface device for diagnosing, scanning and programming the electrical system of a vehicle, with the vehicle interface device selectively operating in either a remote mode or a local mode.

According to an aspect of the present invention, a method of diagnosing, scanning and programming an electrical system of a vehicle includes connecting a vehicle interface device to an electrical system of a vehicle, with the vehicle interface device including a housing, at least one computer module within the housing, and an operator interface. The method further includes selectively setting and operating the vehicle interface device in either a local mode or a remote mode, with the vehicle interface device being set in the local mode or the remote mode via the operator interface, receiving and transmitting vehicle data signals from and to the electrical system of the vehicle with the vehicle interface device, and converting received vehicle data signals for transmission to either a local diagnostic computer or to a remote diagnostic computer. In the local mode, vehicle data signals received from the electrical system are converted by the vehicle interface device for transmission to the local diagnostic computer, and local computer signals received by the vehicle interface device from the local diagnostic computer are converted to vehicle data signals for transmission to the electrical system. In the remote mode, vehicle data signals received from the electrical system are converted by the vehicle interface device for transmission to the remote diagnostic computer, and remote computer signals received by the vehicle interface device from the remote diagnostic computer are converted to vehicle data signals for transmission to the electrical system.

In accordance with a further aspect of the present invention, a vehicle interface device for diagnosing, scanning and programming an electrical system of a vehicle includes a housing, a vehicle connector configured to connect with the electrical system of the vehicle, a local computer connector configured to connect with a local diagnostic computer that is proximate to the vehicle interface device, at least one computer module within the housing, and an operator interface enabling the vehicle interface to be selectively switched by an operator for operation in a local mode and a remote mode.

According to particular embodiments the vehicle interface device includes a J2534 pass-thru device computer module disposed within the housing and an internet interface computer module disposed within the housing.

The present invention provides a single device for use in diagnosing, scanning and programming an electrical system of a vehicle in either a local mode as a pass-thru device or in a remote mode for assistance by a remote technician. Accordingly, if a mechanic or operator is experiencing difficulty performing diagnostic operations on a vehicle in a local mode, or does not have or have access to the required diagnostic application for the particular make and model of vehicle being tested, the operator may selectively enable the interface device to connect with a remote diagnostic computer. That is, the operator may selectively switch the interface device between a local and remote operational mode, and when in the remote operational mode the interface device exchanges data with the remote diagnostic computer, whereby a remote technician can perform and/or assist the operator to perform diagnostics on the vehicle. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
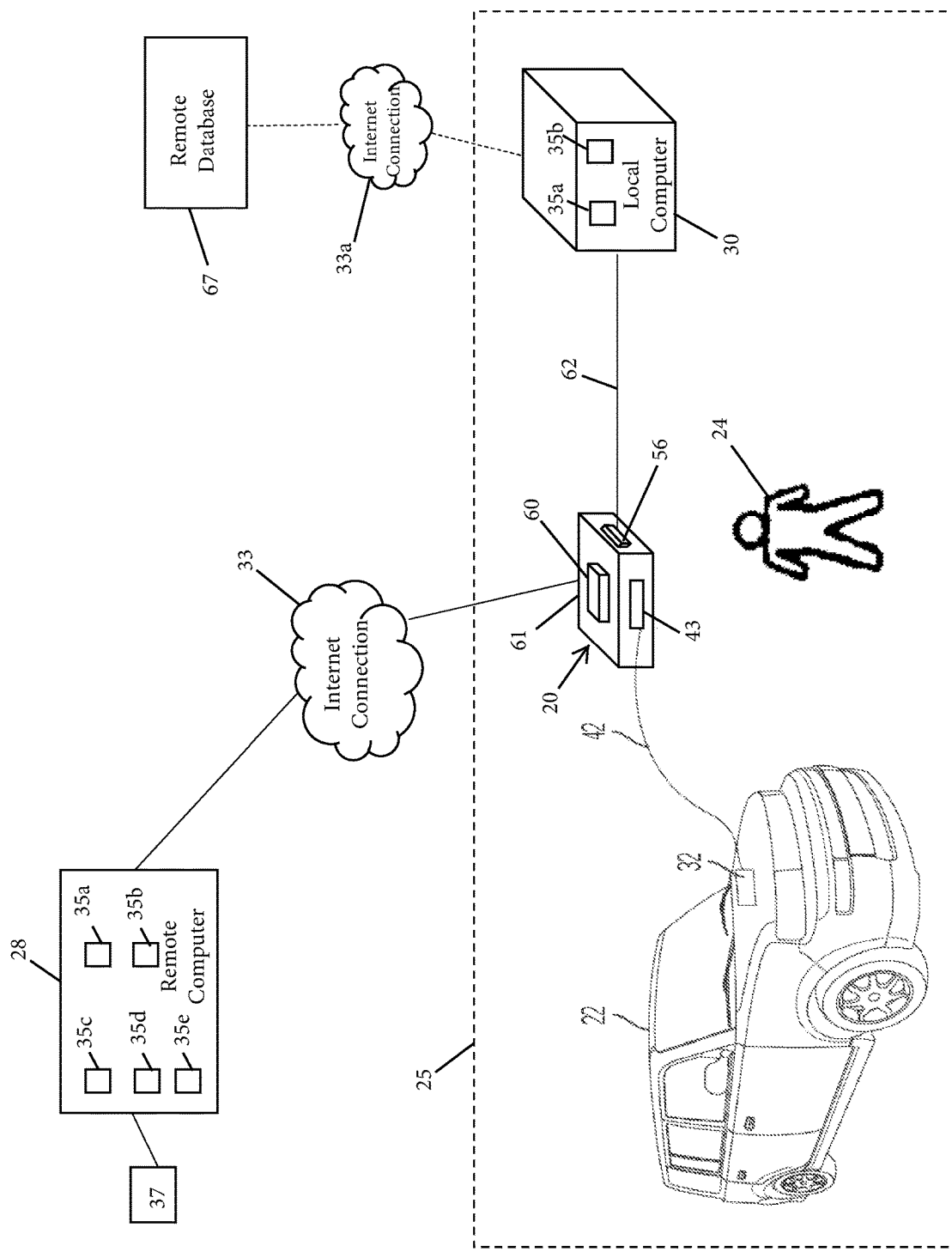
FIG. 1 is a schematic illustration of a vehicle interface device in accordance with the present invention shown connected to a vehicle and a local computer at a repair facility, and connected to a remote computer.
Figure 2:
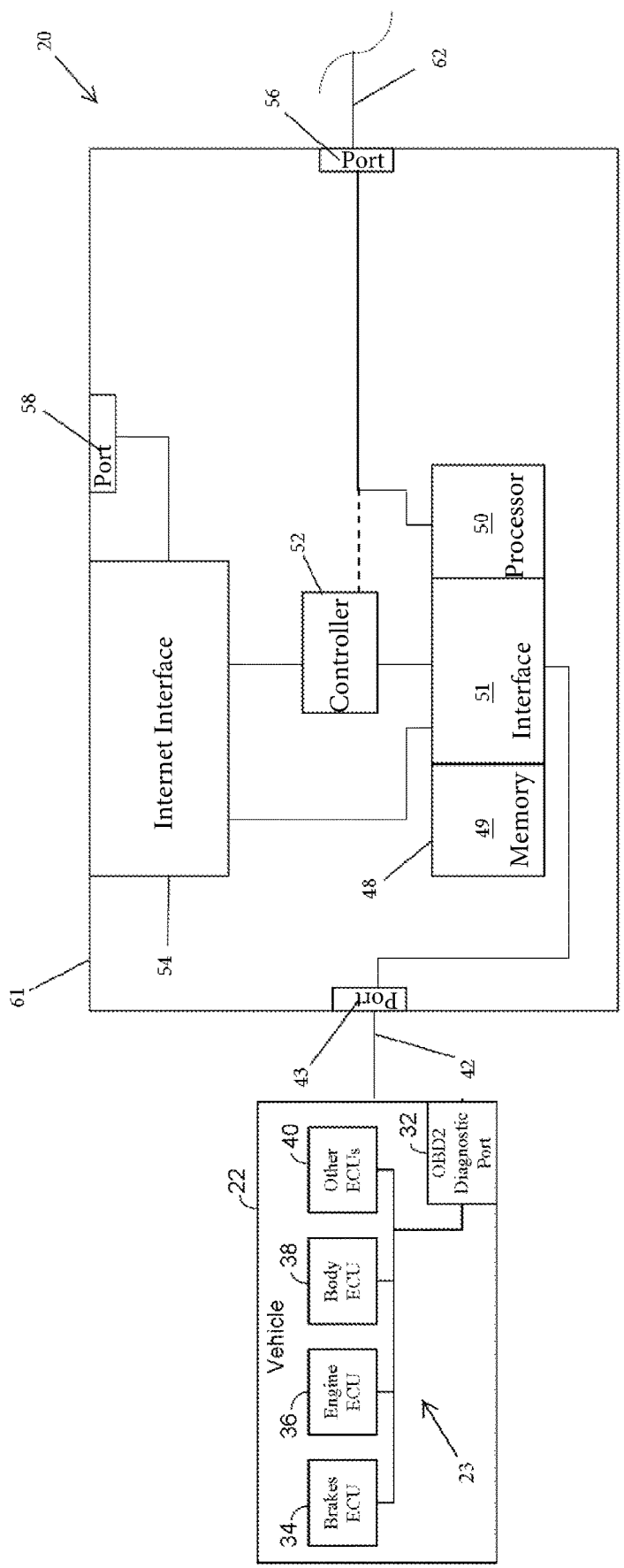
FIG. 2 is an illustration of one configuration for a vehicle interface device in accordance with the present invention.

With reference to FIGS. 1 and 2, a vehicle diagnostic interface device or tool 20 in accordance with the present invention is shown connected to a vehicle 22 so as to exchange data signals between the vehicle 22 and the interface device 20, with the interface device 20 additionally being connectable with a remote diagnostic computer 28 and/or with a local diagnostic computer 30. Interface device 20 is useable by an operator 24 at a repair facility 25 to diagnose, including to scan and reprogram, the electronic system 23 of vehicle 22, where the interface device 20 and local diagnostic computer 30 are located at the repair facility 25. Alternatively, operator 20 is able to selectively alter the operation of interface device 20 to communicate with the remote diagnostic computer 30 such as by way of an Internet connection 33 to diagnose the electronic system 23. In particular, interface device 20 is configured to receive vehicle data signals in the protocol of the electronic system 23 of the vehicle 22 and convert the vehicle data signals for transmission to either the remote diagnostic computer 28 or the local diagnostic computer 30. As discussed herein, diagnosing of the electrical system of a vehicle may include the scanning and reprogramming of one or more electronic control units ("ECUs") of the vehicle.

In operation, the local diagnostic computer 30 includes one or more diagnostic applications, such as diagnostic software applications 35a, 35b shown that may be supplied by an automotive original equipment manufacturer ("OEM") or by a third party supplier for use in scanning and programming the electronic system 23 of vehicle 22. In the event that the operator 24 experiences difficulty in diagnosing the electronic system 23 utilizing the local computer 30, such as due to complexity, or if the local diagnostic computer 30 does not include the correct or required diagnostic application for use with the particular make and model vehicle 22 being diagnosed, the operator 24 may selectively alter the operation of interface device 20 to communicate with remote diagnostic computer 28. Remote diagnostic computer 28 in turn may include multiple diagnostic software applications, such as the same diagnostic software applications 35a, 35b as are resident on local diagnostic computer 30, as well as additional diagnostic applications, such as diagnostic applications 35c, 35d, 35e as illustrated. Remote diagnostic computer 28 is operable, such as by way of a remote technician 37, to be used to remotely diagnose the electronic system 23 of vehicle 22, including to scan and reprogram the electronic system 23 as needed. Remote diagnostic computer 28 may comprise one or more computers, or servers, or the like.

Diagnostic applications comprise conventional software programs used to diagnose, including to scan and/or program, the electronic systems of various vehicles where, for example, each diagnostic application may be configured for use with a particular vehicle make and model. In operation, diagnostic software applications are used to initiate the sending of request or programming signals to and receiving of responsive vehicle signals from the electronic system of the vehicle, such as to and from the ECUs of the vehicle for purposes of scanning, diagnosing and/or programming the vehicle's electronic system as needed. The scanning, diagnosing and programming processes take repeated back-and-forth signal communication between the vehicle electronic system and the hardware supporting or using the diagnostic software applications and can take an extended period of time to complete.

Vehicle interface device 20 is connected with vehicle 22 by operator 24, such as by connecting to an on-board diagnostic ("OBD") port 32 of the vehicle 22 in order to communicate with the electronic system 23 of vehicle 22, including to diagnose various vehicle electronic control units (ECUs), such as an engine ECU 34, body ECU 36, brakes ECU 38, and/or other ECUs 40, and/or other electronic parts and components of vehicle 22. In the illustrated embodiment vehicle interface device 20 connects with port 32 via vehicle cable 42 where OBD diagnostic port 32 may comprise either a 12-pin port for OBD1 systems or a 16-pin port for OBD2 systems. Interface device 20 in turn includes a corresponding vehicle connector comprising a multi-pin vehicle port 43 to which cable 42 is connected. Alternatively, wireless transceivers may be connected to ports 32 and 43 for the exchange of vehicle data there between, such as via Bluetooth or the like, or the vehicle connector 43 may itself be configured for wireless communication, in which cases cable 42 would not be required.

In the illustrated embodiment vehicle interface device 20 includes a programmable computer module or controller 48 comprising a circuit board, hardware and software configured to receive vehicle data signals in the protocol of the vehicle electronic system 23 from the vehicle 22 and convert the vehicle data signals to another protocol, such as a protocol compatible for use by local computer 30, where local computer 30 may be configured as a PC, laptop, tablet computer or the like. Computer module 48 likewise receives data signals from either local diagnostic computer 30 or remote diagnostic computer 28 and is operable to convert such data signals to the protocol of the vehicle 22 for transmission to the electronic system 23. In the illustrated embodiment computer module 48 is configured to operate in accordance with Society of Automotive Engineers (SAE) J2534 standard as a conventional J2534 pass-thru device. Computer module 48 includes a memory 49, one or more processors 50, such as microprocessors or the like, as well as an interface 51 for exchange of information with additional componentry of interface device 20. In operation, computer module 48 is operable to detect the protocol of vehicle data signals from vehicle 22 and in turn convert vehicle data signals to J2534 protocol messages for subsequent transmittal and use. For example, computer module 48 may include a database of vehicle protocols found in local memory 49 that allow communication with the ECUs of various makes and models of vehicles.

Interface device 20 further includes in the illustrated embodiment two additional computer modules, which also include hardware and software, one of which is a controller 52 having its own processor or processors, and the other of which is an Internet interface that in the illustrated embodiment is configured as a wireless internet modem 54 and includes its own processor or processors. Interface device 20 further includes a local computer connector comprising a port 56, and may include a remote computer port 58 that are accessible on an exterior housing 61 of interface device 20. Still further, internet device 20 also includes an operator interface 60 accessible on an exterior of housing 61. Local computer port 56 comprises a local diagnostic computer interface and in the illustrated embodiment is configured as a USB port whereby a USB cable 62 is connectable between the interface device 20 and local diagnostic computer 30. Alternatively, local computer connector of interface device 20 may be configured to communicate with local diagnostic computer 30 by way of a Bluetooth, Wi-Fi, or other connection. Internet modem 54 comprises a remote diagnostic computer interface for communication with the remote diagnostic computer 28. Alternatively, remote computer port 58 may be used as a remote diagnostic computer interface, where port 58 is connected with the Internet interface computer module and may be configured as an Ethernet port for connection with an Ethernet cable for establishing a remote communication connection. As thus understood from FIGS. 1 and 2, housing 61 contains the J2534 pass-thru computer module 48, controller 52 and internet modem 54, with housing supporting the multi-pin vehicle port 43, local computer port 56 and remote computer port 58, where ports 43, 56 and 58 are operably coupled with the computer module 48, controller 52 and internet modem 54.

In the illustrated embodiment operator interface 60 is configured as or includes a touchscreen, where touchscreen 60 may be operatively connected with or incorporate controller 52. Touchscreen 60 enables operator 24 to selectively enable communications with local diagnostic computer 30 or remote diagnostic computer 28. When selectively operating in a local mode, controller 48 provides outgoing J2534 protocol messages to local diagnostic computer 30 via port 56. Likewise, incoming signals, such as instructions or programming, are provided by local diagnostic computer 30 to interface device 20 via port 56 in J2534 message protocol format, with computer module 48 converting the J2534 messages to the protocol of vehicle 22 for transmission by interface device 20 to the electronic system 23 of vehicle 20. In this local operational mode, the operator 24 may scan, diagnose and program the electronic system 23 of vehicle 20 utilizing the local diagnostic computer 30 and associated diagnostic applications downloaded thereon, such as diagnostic applications 35a, 35b.

Alternatively, if operator 24 is experiencing difficulty performing the diagnostic operations on vehicle 22, or does not have or have access to the required diagnostic application for the particular make and model of vehicle 22 being tested, operator 24 may selectively enable interface device 20 to connect with remote diagnostic computer 28 by way of touchscreen 60 to thereby operate in a remote diagnostic mode. That is, the operator may selectively switch interface device 20 between a local and remote operational mode, and when in the remote operational mode interface device 20 exchanges data with remote diagnostic computer 28. For vehicle data signals received by computer module 48 from electrical system 23, computer module 48 converts the vehicle data signals from the protocol of the vehicle to J2534 protocol messages. Interface device 20, when operating in remote mode, further operates to convert the J2534 protocol messages to an Internet transmittable protocol, such as TCP/IP. In particular, controller 52 or internet modem 54 converts the J2534 protocol messages for transmission to the remote diagnostic computer 28. Remote diagnostic computer 28 in turn transmits Internet compatible J2534 protocol messages to controller 52 or internet modem 54 that are converted to J2534 protocol messages and supplied as J2534 protocol messages to computer module 48. Computer module 48, in turn, is operable to provide signals to the electronic system 23 of vehicle 22 in accordance with the protocol of vehicle 22. It should be appreciated that depending on make and model, vehicles may have different protocols or signal formats for the transmitting and receiving of vehicle data signals via the OBD port.

As noted, in the illustrated embodiment the operator interface is configured as a touchscreen 60. In one embodiment, the touchscreen 60 may be configured as a tablet computer. In addition to switching between local and remote modes of operation, touchscreen 60 may enable an operator to enter information regarding vehicle 22 for use by the remote technician 37 and/or remote diagnostic computer 28, such as the vehicle identification number (VIN) of the vehicle 22 being scanned. Touchscreen 60 may additionally provide information regarding the status of the diagnostic operation on vehicle 22 being performed via the remote diagnostic computer 28. Alternatively or additionally, an operator interface may be configured such as to include a switch mechanism to toggle between local and remote operational modes. Such an alternative operator interface may also include indicator lights, such as LED lights, to indicate the mode of operation and status of the diagnostic operation and/or to indicate a connection with a remote diagnostic computer 28. For example, upon connecting with a remote diagnostic computer 28, the local operator 24 and remote technician 37 may engage in a telephonic discussion regarding the diagnostic operation on vehicle 22, in which case the local operator 24 may verbally convey the VIN to the remote technician 37. In yet a further alternative embodiment, the operator interface may comprise software, such as on controller 52, whereby an operator may selectively switch operation of vehicle interface device between a local and a remote mode by way of connection with a separate computer, such as via the local diagnostic computer 30 via port 56.

Figure 3:
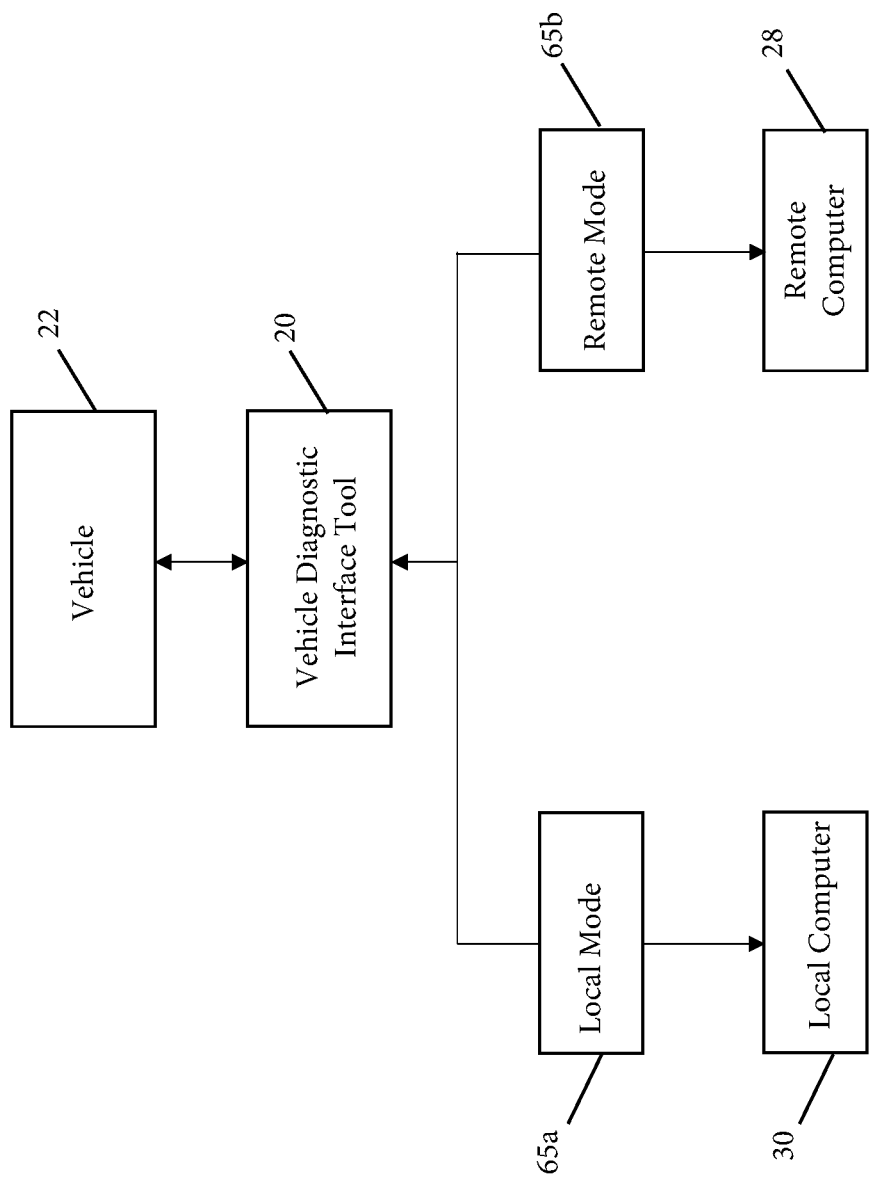
FIG. 3 is a flow diagram of the operation of the vehicle interface device of FIG. 1.

An exemplary diagram of the above operation is illustrated in FIG. 3. As there shown, the vehicle 22 communicates with interface device 20, which in turn may operate in a local mode 65a for communication with local diagnostic computer 30 or operate in a remote mode 65b for communication with remote diagnostic computer 28. As discussed above, the local operator 24 may selectively switch between the local mode 65a and remote mode 65b via the operator interface 60

Local diagnostic computer 30 may itself be connectable to a remote database 67 of diagnostic applications, such as may be run by an OEM or by a third party. For example, local diagnostic computer 30 may be connectable via an Internet connection 33a to a remote computer or server at which one or more diagnostic applications are available, with local diagnostic computer 30 interfacing with such diagnostic applications to diagnose, scan and/or program the electronic system 23 of vehicle 22 via interface device 20.

It should be appreciated that alternative arrangements and configurations of vehicle interface device 20 may be employed within the scope of the present invention. For example, alternative hardware and software configurations may be employed for an interface device in accordance with the present invention relative to that shown in FIGS. 1 and 2 and discussed above. This includes, for example, one or more of the above discussed computer modules being integrated together on a common circuit board, or the like. Moreover, it should be appreciated that the vehicle interface device in accordance with the present invention is operable for use in diagnosing, scanning and programming of components of the electrical system of a vehicle, such as ECUs, in combination with a local and/or remote diagnostic computer, and that the J2534 operability of the disclosed embodiment is with reference to all versions of the SAE J2534 standard, including SAE J2534-1 and SAE J2534-2. It should further be appreciated that references herein to diagnosing and/or diagnostic may include scanning and programming operations. Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A vehicle interface device for diagnosing, scanning and programming an electronic system of a vehicle, said vehicle interface device comprising:
   a housing;
   a vehicle connector at said housing, said vehicle connector configured to connect with an electronic system of a vehicle to receive and transmit vehicle data signals from and to the electronic system;
   a local computer connector at said housing with said local computer connector configured to connect with a local diagnostic computer that is proximate to said vehicle interface device;
   at least one computer module within said housing; and
   an operator interface at said housing, said operator interface enabling said vehicle interface to be selectively switched by an operator for operation in a local mode and a remote mode;
   wherein when in said local mode said at least one computer module is (i) operable to receive vehicle data signals from the electronic system of a vehicle via said vehicle connector and convert the vehicle data signals for transmission to the local diagnostic computer via said local computer connector, and (ii) operable to receive local computer signals from the local diagnostic computer via the local computer connector and convert the local computer signals to vehicle data signals for transmission to the electronic system of the vehicle via said vehicle connector; and wherein when in said remote mode said at least one computer module is (i) operable to receive vehicle data signals from the electronic system of a vehicle via said vehicle connector and convert the vehicle data signals for transmission to a remote diagnostic computer, and (ii) operable to receive remote computer signals from the remote diagnostic computer and convert the remote computer signals to vehicle data signals for transmission to the electronic system of the vehicle via said vehicle connector.

2. The vehicle interface device of claim 1, wherein said at least one computer module comprises a J2534 pass-thru device module.

3. The vehicle interface device of claim 2, wherein said at least one computer module further comprises an internet interface module.

4. The vehicle interface device of claim 3, wherein in said remote mode said internet interface module is configured to convert the vehicle data signals for transmission to the remote diagnostic computer and to receive remote computer signals from the remote diagnostic computer and convert the remote computer signals to vehicle data signals for transmission to the electronic system of the vehicle via said vehicle connector.

5. The vehicle interface device of claim 1, wherein said vehicle connector comprises a vehicle port mounted at said housing with said vehicle port configured to receive a cable connected with the electronic system of the vehicle.

6. The vehicle interface device of claim 5, wherein said vehicle port comprises a multi-pin port.

7. The vehicle interface device of claim 1, wherein said local computer connector comprises a local computer port at said housing with said local computer port configured to receive a cable connected with the local diagnostic computer.

8. The vehicle interface device of claim 7, wherein the local computer port comprises a USB port.

9. The vehicle interface device of claim 1, wherein said operator interface comprises a touchscreen.

10. The vehicle interface device of claim 3, wherein said internet interface module comprises a wireless Internet modem.

11. A vehicle interface device for diagnosing, scanning and programming an electronic system of a vehicle, said vehicle interface device comprising:

a housing, said housing including a local computer interface for communicating with a local diagnostic computer that is proximate to said vehicle interface device, a remote computer interface for communicating with a remote diagnostic computer that is remote from said vehicle interface device, and a vehicle electronic system interface for communicating with an electronic system of a vehicle;

an operator interface at said housing, said operator interface enabling said vehicle interface to be selectively switched by an operator for operation in a local mode and a remote mode;

wherein when in said local mode said vehicle interface device is (i) operable to receive vehicle data signals from the electronic system of a vehicle via said vehicle electronic system interface and convert the vehicle data signals for transmission to the local diagnostic computer via the local computer interface, and (ii) operable to receive local computer signals from the local diagnostic computer via the local computer interface and convert the local computer signals to vehicle data signals for transmission to the electronic system of the vehicle via said vehicle electronic system interface; and wherein when in said remote mode said at least one computer module is (i) operable to receive vehicle data signals from the electronic system of a vehicle via said vehicle electronic system interface convert the vehicle data signals for transmission to a remote diagnostic computer via said remote computer interface, and (ii) operable to receive remote computer signals from the remote diagnostic computer via said remote computer interface and convert the remote computer signals to vehicle data signals for transmission to the electronic system of the vehicle via said vehicle electronic system interface.

12. The vehicle interface device of claim 11, wherein said remote computer interface comprises an internet interface module disposed within said housing.

13. The vehicle interface device of claim 12, wherein in said remote mode said internet interface module is configured to convert the vehicle data signals for transmission to the remote diagnostic computer and to receive remote computer signals from the remote diagnostic computer and convert the remote computer signals to vehicle data signals for transmission to the electronic system of the vehicle via said vehicle connector.

14. The vehicle interface device of claim 12, wherein said internet interface module comprises a wireless Internet modem.

15. The vehicle interface device of claim 11, further comprising a J2534 pass-thru device computer module disposed within said housing.

16. The vehicle interface device of claim 11, wherein said vehicle electronic system interface comprises a multi-pin port configured to receive a cable connected with the electronic system of the vehicle.

17. The vehicle interface device of claim 11, wherein said local computer interface comprises a local computer port at said housing with said local computer port configured to receive a cable connected with the local diagnostic computer.

18. A method of diagnosing, scanning and programming an electronic system of a vehicle, said method comprising:

connecting a vehicle interface device to an electronic system of a vehicle, with the vehicle interface device including a housing, at least one computer module within the housing, and an operator interface;

selectively setting and operating the vehicle interface device in either a local mode or a remote mode with the vehicle interface device being set in the local mode or the remote mode via the operator interface;

receiving and transmitting vehicle data signals from and to the electronic system of the vehicle with the vehicle interface device;

converting received vehicle data signals for transmission to either a local diagnostic computer or to a remote diagnostic computer;

connecting the vehicle interface device to a local diagnostic computer in the local mode, wherein in the local mode vehicle data signals received from the electronic system are converted by the vehicle interface device for transmission to the local diagnostic computer, and wherein in the local mode local computer signals received by the vehicle interface device from the local diagnostic computer are converted to vehicle data signals for transmission to the electronic system; and connecting the vehicle interface device to a remote diagnostic computer in the remote mode, wherein in the remote mode vehicle data signals received from the electronic system are converted by the vehicle interface device for transmission to the remote diagnostic computer, and wherein in the remote mode remote computer signals received by the vehicle interface device from the remote diagnostic computer are converted to vehicle data signals for transmission to the electronic system.

19. The method of claim 18, wherein the vehicle interface device includes a J2534 pass-thru device computer module disposed within the housing.

20. The method of claim 18, wherein the vehicle interface device includes an internet interface computer module disposed within the housing.

\* \* \* \* \*